(12) United States Patent
Takatani et al.

(10) Patent No.: US 8,213,158 B2
(45) Date of Patent: Jul. 3, 2012

(54) SOLID ELECTROLYTIC CAPACITOR AND ITS PRODUCTION METHOD

(75) Inventors: Kazuhiro Takatani, Amagasaki (JP); Mutsumi Yano, Hirakata (JP); Takashi Umemoto, Hirakata (JP); Hiroshi Nonoue, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 597 days.

(21) Appl. No.: 12/237,454

(22) Filed: Sep. 25, 2008

(65) Prior Publication Data

US 2009/0086413 A1 Apr. 2, 2009

(30) Foreign Application Priority Data

Sep. 28, 2007 (JP) ................. 2007-253846

(51) Int. Cl.
*H01G 9/00* (2006.01)
*H01G 4/06* (2006.01)
*H01G 9/04* (2006.01)
*B05D 5/12* (2006.01)

(52) U.S. Cl. ........ 361/523; 361/532; 361/524; 361/528; 29/25.03; 427/80

(58) Field of Classification Search .......... 361/523–524, 361/528, 532; 29/25.03; 427/80
See application file for complete search history.

(56) References Cited

U.S. PATENT DOCUMENTS

| | | | | |
|---|---|---|---|---|
| 5,729,428 | A * | 3/1998 | Sakata et al. | 361/523 |
| 6,430,033 | B1 | 8/2002 | Mitsui et al. | |
| 6,975,503 | B2 * | 12/2005 | Abe et al. | 361/533 |
| 7,218,506 | B2 * | 5/2007 | Kobayashi et al. | 361/523 |
| 2004/0113242 | A1 * | 6/2004 | Kato et al. | 257/666 |
| 2005/0111165 | A1 * | 5/2005 | Merker et al. | 361/525 |
| 2005/0128685 | A1 * | 6/2005 | Hasegawa | 361/525 |
| 2005/0278915 | A1 * | 12/2005 | VanNatta et al. | 29/25.03 |
| 2006/0082951 | A1 * | 4/2006 | Hirata et al. | 361/524 |
| 2006/0084237 | A1 * | 4/2006 | Kobayashi | 438/381 |
| 2006/0221549 | A1 * | 10/2006 | Iida et al. | 361/313 |
| 2007/0171596 | A1 * | 7/2007 | Chacko et al. | 361/523 |
| 2007/0171597 | A1 * | 7/2007 | Merker et al. | 361/523 |
| 2007/0232012 | A1 * | 10/2007 | Takatani et al. | 438/381 |
| 2007/0242412 | A1 * | 10/2007 | Chacko et al. | 361/301.1 |
| 2008/0005878 | A1 * | 1/2008 | Merker et al. | 29/25.03 |
| 2008/0030929 | A1 * | 2/2008 | Chacko | 361/523 |

(Continued)

FOREIGN PATENT DOCUMENTS

JP 04-048710 A 2/1992
JP 10-321471 A 12/1998

*Primary Examiner* — Bradley Thomas
(74) *Attorney, Agent, or Firm* — Marvin A. Motsenbocker; Mots Law, PLLC

(57) ABSTRACT

Provided is a solid electrolytic capacitor comprising an anode of a porous body formed of a valve metal or its alloy, a dielectric layer formed on the surface in the inside part of the porous body and on the surface in the outer peripheral part thereof, a conductive polymer layer formed on the dielectric layer, a cathode layer formed on the conductive polymer layer in the outer peripheral part of the porous body, and an anode lead of which one end is embedded inside the anode, wherein the conductive polymer layer in the first region which is in the inside part of the porous body and the periphery around the anode lead as the center is formed of a polypyrrole layer, and the conductive polymer layer in the second region which is the periphery around the first region is formed by laminating a polypyrrole layer on a polyethylenedioxythiophene layer.

12 Claims, 7 Drawing Sheets

U.S. PATENT DOCUMENTS

| | | | |
|---|---|---|---|
| 2008/0116416 A1* | 5/2008 | Chacko | 252/62.2 |
| 2009/0059477 A1* | 3/2009 | Petrzilek et al. | 361/525 |
| 2009/0103247 A1* | 4/2009 | Karnik | 361/529 |
| 2009/0185329 A1* | 7/2009 | Breznova et al. | 361/529 |
| 2009/0185330 A1* | 7/2009 | Breznova et al. | 361/529 |
| 2009/0185941 A1* | 7/2009 | Breznova et al. | 419/26 |
| 2010/0103590 A1* | 4/2010 | Saida et al. | 361/525 |
| 2010/0214723 A1* | 8/2010 | Karnik | 361/528 |

* cited by examiner

SOLID ELECTROLYTIC CAPACITOR AND ITS PRODUCTION METHOD

BACKGROUND OF THE INVENTION

1. Field of the Invention

The present invention relates to a solid electrolytic capacitor and its production method.

2. Description of the Related Art

With the recent tendency toward high-performance central processing unit (CPU) of personal computer (PC), it is desired to develop solid electrolytic capacitors having a reduced ESR (equivalent series resistance) in a high-frequency region. ESR depends on cathode conductivity and, in a case of multilayered cathode lamination, it depends on the contact resistance between the cathode layers.

In general, a solid electrolytic capacitor comprises a porous anode formed of a valve metal or its alloy and a dielectric layer formed on the surface in the inside part or the outer peripheral part of the anode through anodic oxidation thereon, in which an electrolyte layer is provided on the dielectric layer, and a cathode is formed thereon. JP-A 4-48710 proposes formation of a conductive polymer film containing an aromatic sulfonic acid anion as a part of dopant therein on a dielectric layer through chemical polymerization, and additional formation of a conductive polymer film thereon through electrolytic polymerization.

JP-A-Hei-10-321471 proposes formation of a first conductive polymer layer of polythiophene or its derivative followed by formation thereon of a second conductive polymer layer through electrolytic polymerization of polypyrrole or its derivative, and use of these as electrolyte layers.

However, even the methods proposed by these prior-art techniques could not sufficiently reduce ESR.

SUMMARY OF THE INVENTION

An object of the present invention is to provide a solid electrolytic capacitor capable of reducing ESR, and its production method.

The solid electrolytic capacitor of a first aspect of the invention comprises an anode of a porous body formed of a valve metal or its alloy, a dielectric layer formed on the surface in the inside part of the porous body and on the surface in the outer peripheral part thereof, a conductive polymer layer formed on the dielectric layer, a cathode layer formed on the conductive polymer layer in the outer peripheral part of the porous body, and an anode lead of which one end is embedded inside the anode, wherein the conductive polymer layer in the first region which is in the inside part of the porous body and the periphery around the anode lead as the center is formed of a polypyrrole layer alone, and the conductive polymer layer in the second region which is the periphery around the first region of the porous body is formed by laminating a polypyrrole layer on a polyethylenedioxythiophene layer.

In the first aspect of the invention, the first region is defined to be the region around the anode lead as the center thereof inside the porous body. This definition is based on the presumption that the anode lead may be positioned nearly in the center inside the porous body. However, the anode lead is not always positioned nearly in the center inside the porous body. In a second aspect of the invention, the first region is defined to be the region that is provided in the inside part of the porous body.

The solid electrolytic capacitor of the second aspect of the invention comprises an anode of a porous body formed of a valve metal or its alloy, a dielectric layer formed on the surface in the inside part of the porous body and on the surface in the outer peripheral part thereof, a conductive polymer layer formed on the dielectric layer, a cathode layer formed on the conductive polymer layer in the outer peripheral part of the porous body, and an anode lead of which one end is embedded inside the anode, wherein the conductive polymer layer includes a first region provided in the inside part of the porous body and a second region which is the periphery around the first region, the first region is formed of a polypyrrole layer alone, and the second region is formed by laminating a polypyrrole layer on a polyethylenedioxythiophene layer.

The matter common to the first aspect and the second aspect of the invention is described as "the invention".

In the invention, the conductive polymer layer in the first region which is in the inside part of the porous body and the periphery around the anode lead as the center, or in the first region provided in the inside part of the porous body is formed of a polypyrrole layer alone. The conductive polymer layer in the second region which is the periphery around the first region of the porous body is formed by laminating a polypyrrole layer on a polyethylenedioxythiophene layer. Accordingly, in the invention, the conductive polymer layer in the first region, or that is, in the inner region of the porous body is formed of a polypyrrole layer alone; and the conductive polymer layer in the second region that is the outside region of the first region has a laminate structure of a polypyrrole layer formed on a polyethylenedioxythiophene layer.

The polypyrrole layer is a conductive polymer layer having excellent adhesiveness, but is problematic in that its conductivity is poor. On the other hand, the polyethylenedioxythiophene layer has excellent conductivity but is problematic in that its adhesiveness is poor. In the invention, the conductive polymer layer in the first region that is the inside region of the porous body is formed of a polypyrrole layer alone, and therefore, the conductive polymer layer has excellent adhesiveness.

The conductive polymer layer in the second region including the outer peripheral part of the porous body is formed of a laminate structure of a polyethylenedioxythiophene layer and a polypyrrole layer, and therefore, this has excellent conductivity.

Accordingly, in the invention, the adhesiveness of the conductive polymer layer inside the porous body is enhanced, and the conductivity of the conductive polymer layer in the outer peripheral part of the porous body is enhanced, whereby ESR of the capacitor can be significantly reduced.

In the invention, it is preferred that each depth from the outer peripheral surface of the dielectric layer in the outer peripheral part of the porous body to an interface between the first region and the second region is substantially even throughout the whole second region. As the evenness, it is preferred that a dispersion of the depth is in the range of ±10%.

In the invention, it is also preferred that a depth of the second region from the outer peripheral surface of the dielectric layer in the outer peripheral part of the porous body is within a range of 0.67 to 33%, when a depth from the outer peripheral surface of the dielectric layer in the outer peripheral part of the porous body to the center of the porous body in a thickness direction is defined as 100%, wherein the thickness direction is defined as a direction in which a distance from a first outer peripheral surface of the dielectric layer in the outer peripheral part of the porous body to a second outer peripheral surface opposed to the first outer peripheral surface in a normal line direction of the first outer peripheral surface is the shortest among every distances defined above.

When the porous body has a substantially rectangular shape, it is preferred that a depth of the second region from the outer peripheral surface of the dielectric layer in the outer peripheral part of the porous body is within a range of 0.67 to 33%, while a depth from the outer peripheral surface of the dielectric layer in the outer peripheral part of the porous body to the center of the porous body in a thickness direction is defined as 100%, wherein the thickness direction is defined as a direction which provides with the shortest dimension among the dimension directions perpendicular to one another in the substantially rectangular shape.

When the depth of the second region falls within the range, ESR of the capacitor may be reduced more.

The production method of the invention is a method for producing the above-mentioned solid electrolytic capacitor of the invention, which comprises a step of forming an anode of a porous body with one end of an anode lead embedded therein, a step of forming a dielectric layer on the surface in the inside part and the outer peripheral part of the porous body, a step of dipping the dielectric layer-having porous body in a solution of ethylenedioxythiophene and then heat-treating it at a predetermined temperature to thereby form a polyethylenedioxythiophene layer on the dielectric layer in the second region, and a step of forming a polypyrrole layer on the dielectric layer in the first region and on the polyethylenedioxythiophene layer in the second region.

According to the production method of the invention, the above-mentioned solid electrolytic capacitor of the invention can be produced in a simplified manner.

The anode in the invention is formed of a porous body of a valve metal or its alloy. Not specifically defined, the valve metal may be any one usable in solid electrolytic capacitors and includes, for example, niobium, tantalum, titanium, aluminum, hafnium, zirconium, tungsten, etc. Its alloy may be an alloy comprising any of these metals as the main ingredient thereof (that is, containing it in an amount of at least 50% by mass).

A fine powder of a valve metal or its alloy is shaped into a shaped body, and the shaped body is sintered by heating at a high temperature to give a porous body. In forming the porous body, an anode lead is embedded inside the shaped body, whereby an anode with one end of the anode lead embedded therein may be formed. The anode lead may be formed of the above-mentioned valve metal or its alloy.

A dielectric layer is formed on the surface in the inside part and on the surface in the outer peripheral part of the porous body formed in the manner as above. The dielectric layer may be formed, for example, through anodic oxidation of the surface in the inside part and the surface in the outer peripheral part of the porous body, using an aqueous phosphoric acid solution.

In the production method of the invention, after the dielectric layer is formed in the manner as above, the porous body is dipped in a solution of ethylenedioxythiophene so that the solution is adhered onto the surface in the inside part and onto the surface in the outer peripheral part of the porous body, and thereafter this is heat-treated at a predetermined temperature to thereby form a polyethylenedioxythiophene layer on the dielectric layer. For example, by controlling the temperature in the heat treatment, the depth of the second region in which the polyethylenedioxythiophene layer is formed can be controlled. At a high heat-treatment temperature, the polyethylenedioxythiophene layer may be formed in the deep part inside the porous body. Accordingly, at a high heat-treatment temperature, the second region may be formed in the deep part.

As so mentioned in the above, it is preferred that a depth of the second region from the outer peripheral surface of the dielectric layer in the outer peripheral part of the porous body is within a range of 0.67 to 33%, when a depth from the outer peripheral surface of the dielectric layer in the outer peripheral part of the porous body to the center of the porous body in a thickness direction is defined as 100%.

In the manner as above, after the polyethylenedioxythiophene layer is formed on the dielectric layer in the second region, a polypyrrole layer is formed on the dielectric layer in the first region and on the polyethylenedioxythiophene layer in the second region. The polypyrrole layer may be formed through chemical polymerization and/or electrolytic polymerization. In general, it is desirable that, after a polypyrrole layer is formed through chemical polymerization with an oxidizing agent, an additional polypyrrole layer is further formed through electrolytic polymerization using the previously-formed polypyrrole layer as an electrode.

Next, a cathode layer is formed on the conductive polymer layer, or that is, the polypyrrole layer in the outer peripheral part of the porous body. The cathode layer is generally composed of a carbon layer and a silver layer, and is formed by applying a carbon paste to form a carbon layer followed by applying a silver paste thereon to form a silver layer.

In general, the other end of the anode lead is connected to an anode terminal, and the cathode layer is connected to a cathode terminal. With a part of the thus-connected anode terminal and a part of the cathode terminal kept exposed outside, a resin casing to cover the anode and the anode lead is formed of a sealant resin such as an epoxy resin by molding, thereby completing a solid electrolytic capacitor.

According to the invention, the solid electrolytic capacitor may have a reduced ESR.

According to the production method of the invention, the solid electrolytic capacitor having a reduced ESR can be produced in a simplified manner.

DESCRIPTION OF THE PREFERRED EMBODIMENTS

The invention is described in more detail with reference to its embodiments, to which, however, the invention should not be limited. Not changing the spirit and the scope thereof, the invention may be changed and modified in any desired manner.

First Embodiment

Figure 2:
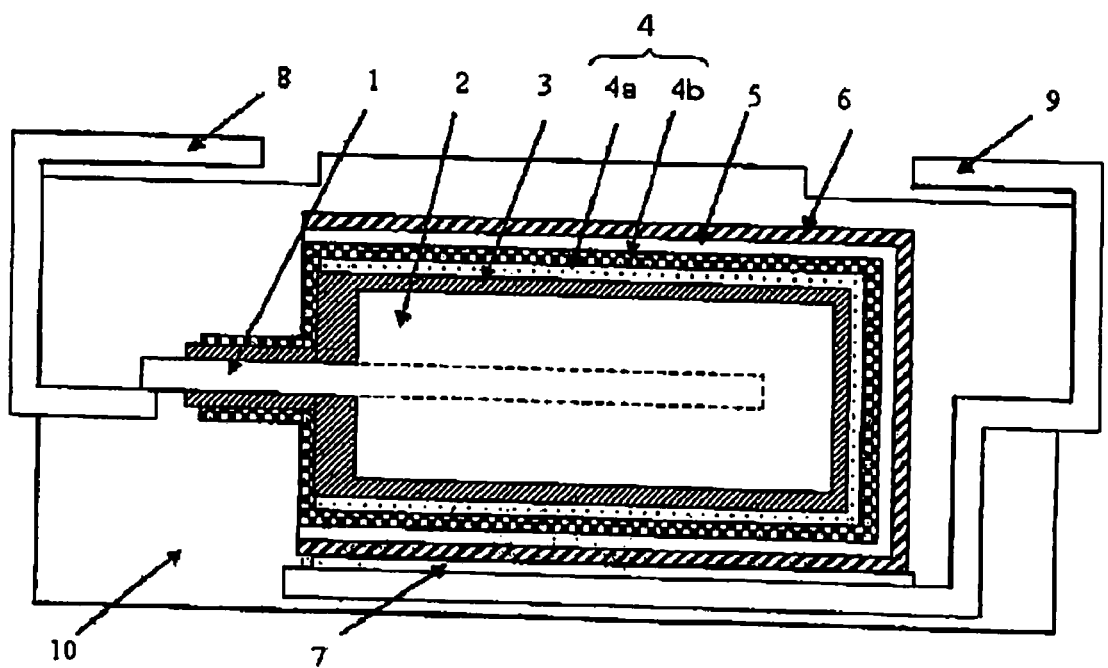
FIG. 2 is a cross-sectional view showing one embodiment of a solid electrolytic capacitor of the invention.

FIG. 2 is a cross-sectional view showing one embodiment of a solid electrolytic capacitor of the invention.

As shown in FIG. 2, one end of an anode lead 1 is embedded inside an anode 2. The anode 2 is formed of a porous body of a valve metal or its alloy. The porous body is formed by shaping a powder of a valve metal or its alloy and sintering it. In forming the sintered body, one end of an anode lead 1 is disposed inside the shaped body, whereby the anode lead 1 is embedded inside the anode 2.

On the surface of the anode (porous body) 2, formed is a dielectric layer 3. The dielectric layer 3 is formed by anodic oxidation of the surface of the anode (porous body) 2. Not shown in FIG. 2, a dielectric layer 3 is also formed on the surface in the inside part of the anode (porous body) 2.

Figure 1:
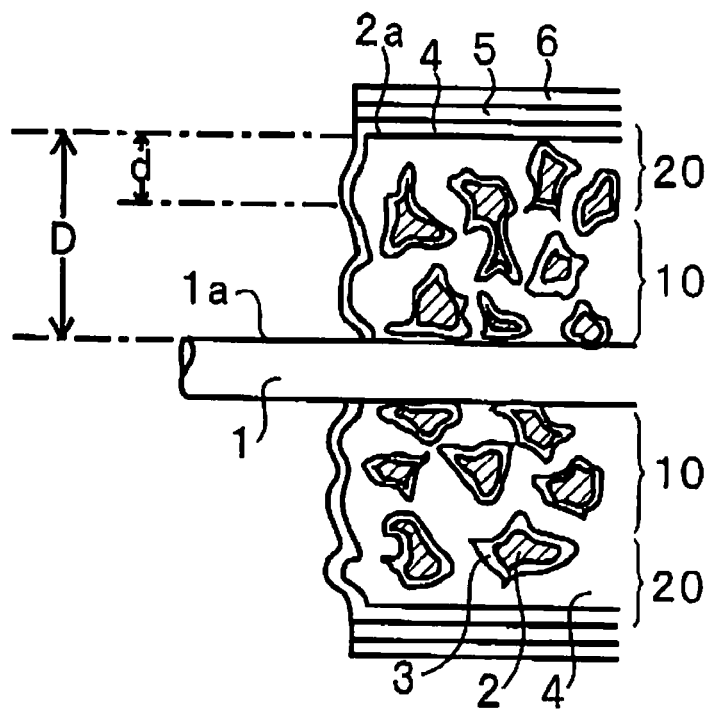
FIG. 1 is a schematic cross-sectional view showing a condition of the inside part and the outer peripheral part of an anode (porous body) in one embodiment of the invention.

FIG. 1 is a schematic cross-sectional view showing the inside part of the anode (porous body) 2. As shown in FIG. 1, the anode 2 is a porous body, and therefore, a dielectric layer 3 is formed on the surface in the inside part thereof.

On the dielectric layer 3 on the surface in the inside part and the outer peripheral part of the anode (porous body) 2, formed is a conductive polymer layer 4. In the first region inside the anode (porous body) 2 around the anode lead 1 as the center thereof, the conductive polymer layer 4 is formed of a polypyrrole layer alone.

Figure 3:
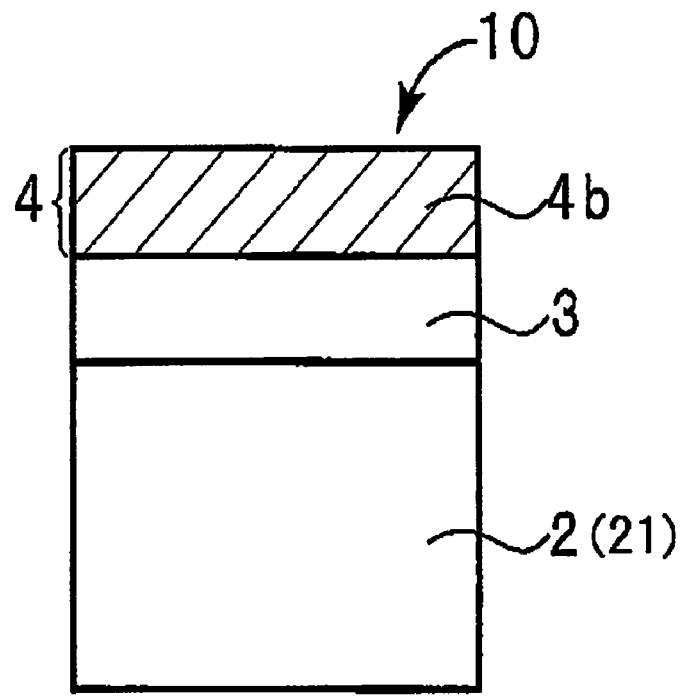
FIG. 3 is a schematic cross-sectional view showing the dielectric layer and the conductive polymer layer in the first region in the inside part of the anode (porous body) of the invention.

FIG. 3 is a schematic cross-sectional view showing the conductive polymer layer 4 in the first region 10. As shown in FIG. 3, only a polypyrrole layer 4b is formed on the dielectric layer 3 in the first region 10, and the conductive polymer layer 4 is formed of the polypyrrole layer 4b alone.

As shown in FIG. 1, a second region 20 is positioned around the first region 10. The second region 20 is a region comprising the periphery of the first region 10 of the anode (porous body) 2 and the outer peripheral part of the anode (porous body) 2.

Figure 4:
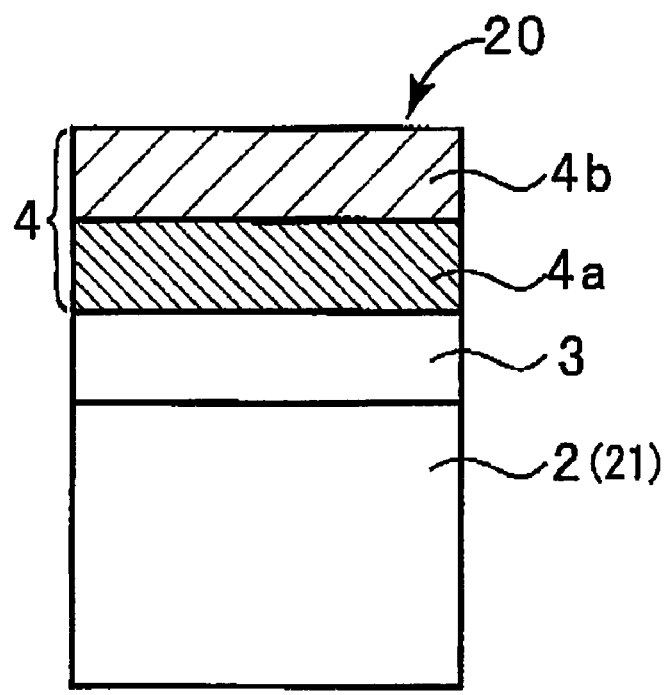
FIG. 4 is a schematic cross-sectional view showing the dielectric layer and the conductive polymer layer in the second region in the inside part of the anode (porous body) of the invention.

FIG. 4 is a schematic cross-sectional view showing the conductive polymer layer 4 in the second region 20. As shown in FIG. 4, in the second region 20, a polyethylenedioxythiophene layer 4a is formed on the dielectric layer 3; and a polypyrrole layer 4b is formed on the polyethylenedioxythiophene layer 4a. The conductive polymer layer 4 is formed of the polyethylenedioxythiophene layer 4a and the polypyrrole layer 4b.

As mentioned in the above, the conductive polymer layer in the first resin 10 and the second region 20 may be formed by forming the polyethylenedioxythiophene layer 4a on the dielectric layer 3 in the second region 20, and then forming the polypyrrole layer 4b on the dielectric layer 3 in the first region 10 and on the polyethylenedioxythiophene layer 4a in the second region 20.

As shown in FIG. 2, a carbon layer 5 is formed on the conductive polymer layer 4 in the outer peripheral part of the anode (porous body) 2 formed in the manner as above. The carbon layer 5 maybe formed by applying a carbon paste. On the carbon layer 5, formed is a silver layer 6. The silver layer 6 may be formed by applying a silver paste. The cathode layer is composed of the carbon layer 5 and the silver layer 6.

Figure 5:
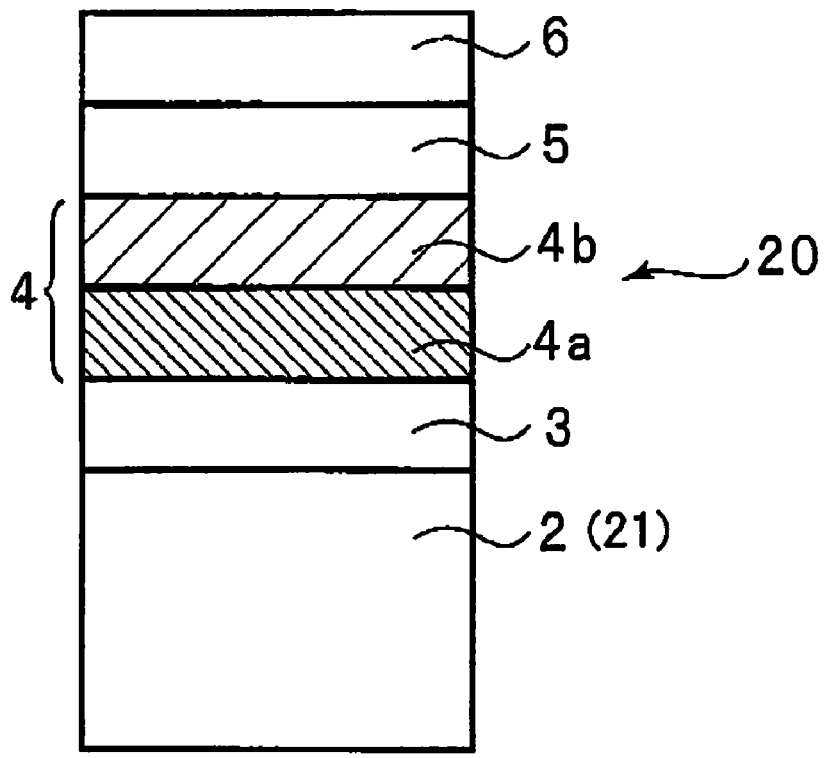
FIG. 5 is a schematic cross-sectional view showing the dielectric layer and the conductive polymer layer in the second region in the outer peripheral part of the anode (porous body) of the invention.

FIG. 5 is a schematic cross-sectional view showing the conductive polymer layer 4 on the surface in the outer peripheral part of the anode (porous body) 2. As shown in FIG. 5, a carbon layer 5 and a silver layer 6 are formed on the conductive polymer layer 4 on the surface in the outer peripheral part of the anode (porous body) 2.

A cathode terminal 9 is connected to the silver layer 6S via a conductive adhesive layer 7. An anode terminal 8 is connected to the other end of the anode lead by welding. With the a part of the anode terminal 8 and a part of the cathode terminal 9 kept exposed outside, a resin casing to 10 cover the anode (porous body) 2 is formed of a sealant resin such as an epoxy resin by molding.

FIG. 1 is referred to. In the invention, when the depth D from the outer peripheral surface 2a of the dielectric layer in the outer peripheral part of the anode (porous body) 2 to the outer peripheral surface 1a of the anode lead 1 is defined as 100%, then the depth d of the second region 20 is preferably within a range of from 0 to 50%, more preferably within a range of from 5 to 30%, as so mentioned in the above. The depth d of the second region 20 may be controlled by controlling how the polyethylenedioxythiophene layer 4a is to be formed to what depth d from the outer peripheral surface of the anode (porous body) 2. This may be controlled by controlling the concentration of the ethylenedioxythiophene solution to be used or controlling the dipping method, or by controlling the temperature in the heat treatment to be attained after dipping the anode (porous body) 2 in the ethylenedioxythiophene solution.

Since the anode (porous body) 2 is porous, the outer peripheral surface 2a of the dielectric layer in the outer peripheral part of the anode (porous body) 2 is rough, and the mean position of the roughness of the surface may be the outer peripheral surface of the layer. The outer peripheral surface of the dielectric layer in that condition may be defined, for example, by observing the cross section of the anode (porous body) 2 with a microscope.

The depth d of the second region 20 may be determined, based on the sulfur concentration distribution in the polyethylenedioxythiophene layer in the cross section of the anode (porous body) 2 through EPMA (electron probe microanalysis).

Figure 6:
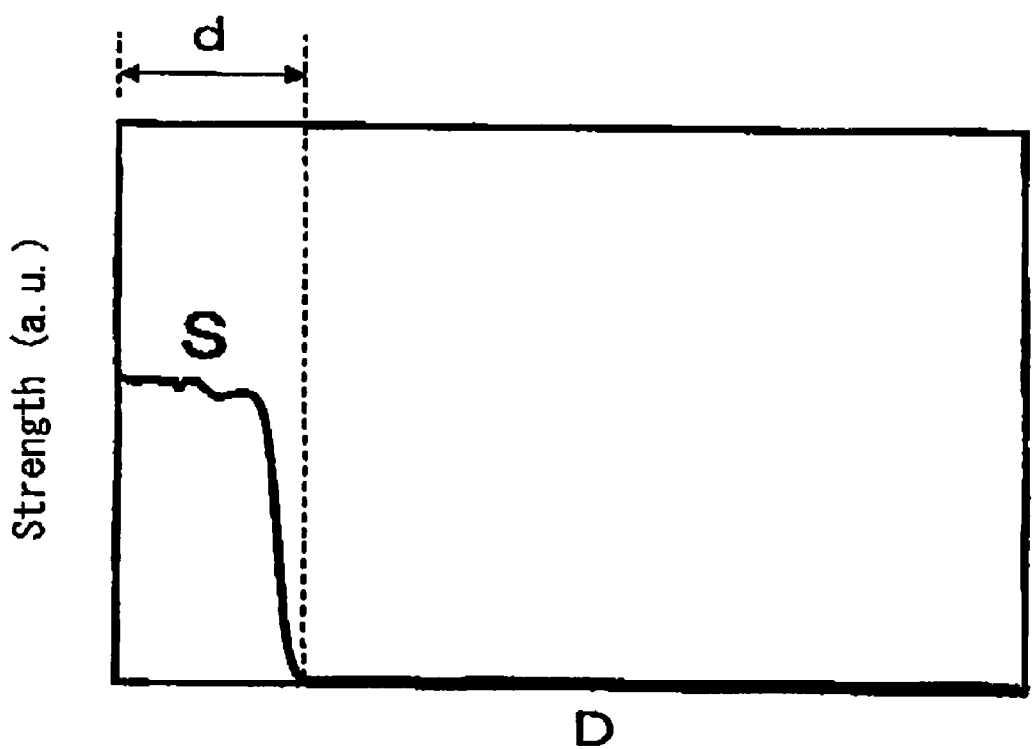
FIG. 6 is a concentration distribution pattern of sulfur (S) obtained through EPMA analysis.

FIG. 6 is a graph showing the sulfur (S) concentration distribution obtained from the above EPMA analysis. As shown in FIG. 6, in the depth D, sulfur (S) exists within the region of the depth d; and based on the depth D of 100%, the depth d in the graph could be the depth d of the second region 20.

In the solid electrolytic capacitor of this embodiment, the polypyrrole layer 4b that is highly adhesive is formed on the dielectric layer 3 in the first region 10 inside the anode (porous body) 2. In the second region 20, the polyethylenedioxythiophene layer 4a is formed on the dielectric layer 3, and the polypyrrole layer 4b is formed on it. The polyethylenedioxythiophene layer 4a has good conductivity, and therefore, in the second region 20, the conductive polymer layer 4 may have good conductivity.

Accordingly, the solid electrolytic capacitor of one embodiment of the invention has the conductive polymer layer 4 having good conductivity and excellent in adhesiveness, and it may have a greatly reduced ESR.

Second Embodiment

The this embodiment will be described with respect to only the different matters from the first embodiment in the following.

Figure 8:
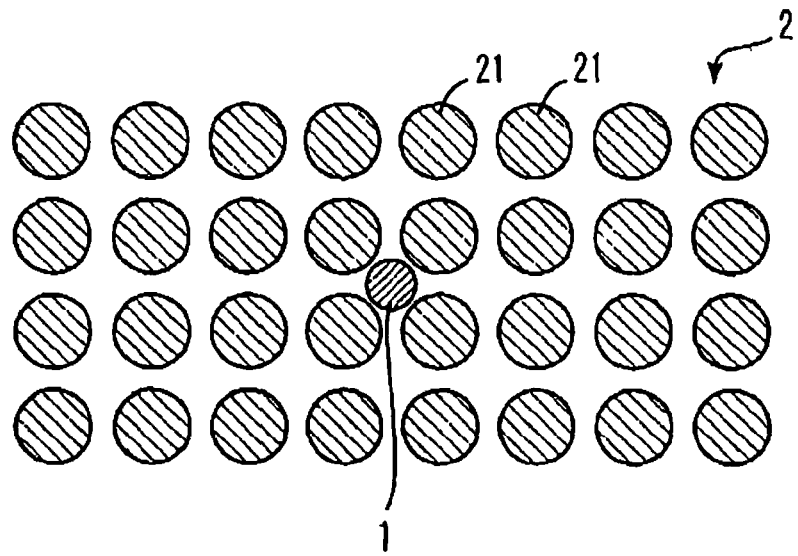
FIG. 8 is a schematic cross-sectional view between A-A in FIG. 7A.
Figure 9:
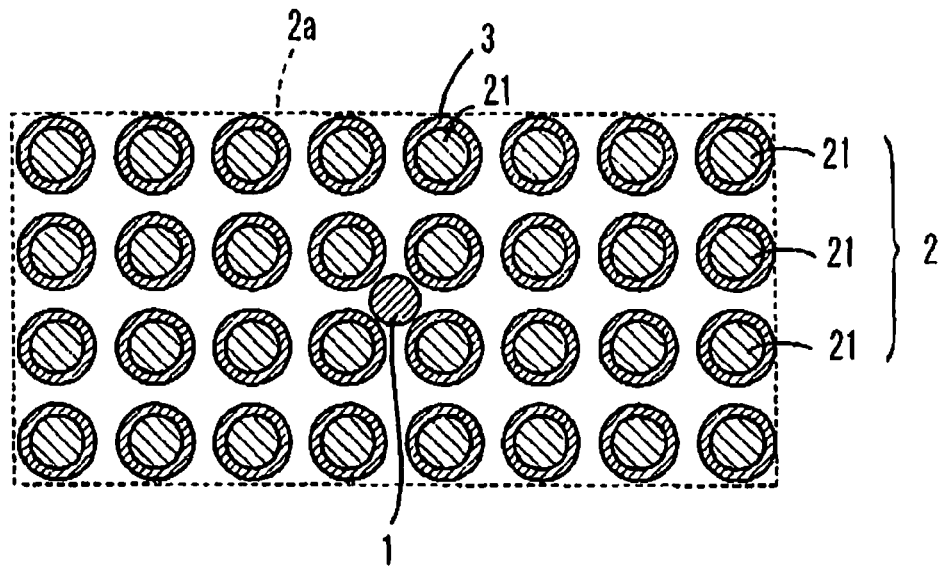
FIG. 9 is a schematic cross-sectional view between A-A in FIG. 7B.
Figure 10:
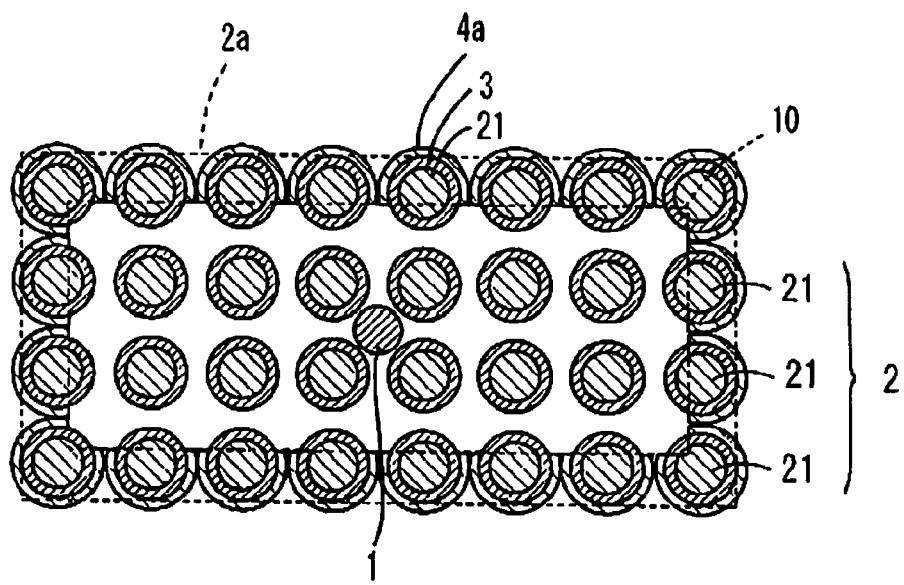
FIG. 10 is a schematic cross-sectional view between A-A in FIG. 7C.
Figure 11:
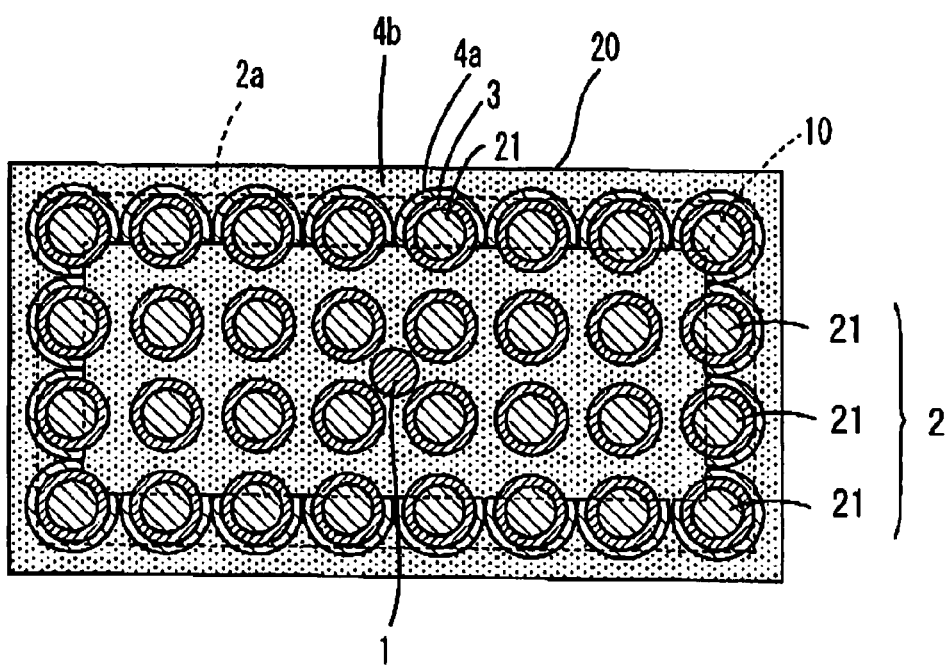
FIG. 11 is a schematic cross-sectional view between A-A in FIG. 7D.
Figure 12:
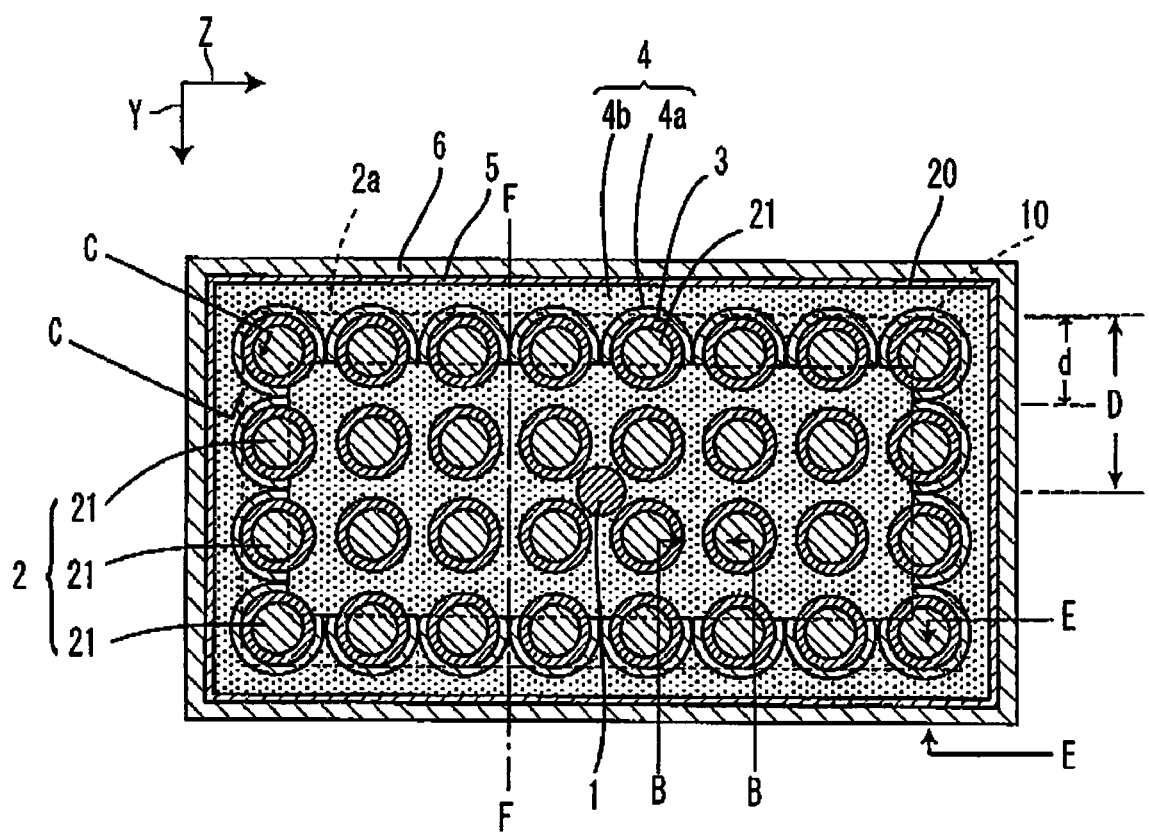
FIG. 12 is a schematic cross-sectional view between A-A in FIG. 7E.

FIGS. 7A to 7E are perspective views showing a process fox producing a solid electrolytic capacity of another embodiment of the invention. FIG. 8 is a schematic cross-sectional view between A-A in FIG. 7A. FIG. 9 is a schematic cross-sectional view between A-A in FIG. 7B. FIG. 10 is a schematic cross-sectional view between A-A in FIG. 7C. FIG. 11 is a schematic cross-sectional view between A-A in FIG. 7D. FIG. 12 is a schematic cross-sectional view between A-A in FIG. 7E.

Figure 7A:
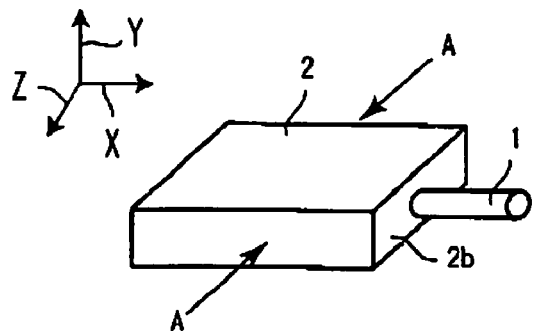
FIGS. 7A to 7E are perspective views showing a process for producing a solid electrolytic capacity of another embodiment of the invention.

FIG. 7A shows an anode 2 with an anode lead 1 embedded therein. The anode 2 is a porous body having a rectangular shape, and the anode lead 1 is embedded therein through the center part of the side 2b thereof. As shown in FIG. 7A, the anode 2 has a flattened rectangular shape that is long in the X direction and is short in the Y direction.

The schematic cross-sectional views of FIG. 8 to FIG. 12 show the cross section of the anode 2. FIG. 8 to FIG. 12 show schematically the porous body, in which the particles 21 expressing the porous body of the anode body 2 have spherical shapes and are disposed equally spaced from one another, while actually having random shapes and random disposition. Each particle is connected to the other particles physically and electrically, and the particles 21 around the anode lead 1 are also connected to the anode lead 1.

As shown in FIG. 8, the anode 2 is a porous body formed by sintering the compact formed from a plenty of the particles 21, having a large number of open pores formed inside it. The particles 21 are particles of a valve metal. In this embodiment, the anode lead 1 is embedded so that it could run through the center of the anode 2. The center of the anode 2 is positioned in the mass center of gravity (the center of gravity) of the anode 2.

Figure 7B:
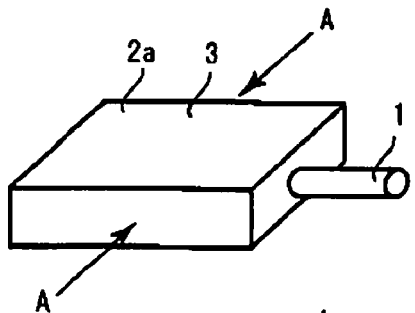

FIG. 7B shows a condition of a dielectric layer 3 formed by anodic oxidation of the surface of the anode 2.

As shown in FIG. 9, the dielectric layer 3 is formed by anodic oxidation of the surface of the particles 21. Since the anode 2 is a porous body composed of the particles 21, the dielectric layer 3 is formed also on the surface of the particles 21 in the inside part of the porous body.

FIG. 9 shows the outer peripheral surface 2a of the dielectric layer 3 in the outer peripheral part of the anode 2. Since the anode 2 is a porous body, its outer peripheral surface 2a is rough, as so mentioned in the above. In the invention, the mean position of the roughness of the surface is the outer peripheral surface 2a. Since FIG. 9 is a schematic view, the roughness of the outer peripheral surface 2a is not shown therein.

Figure 7C:
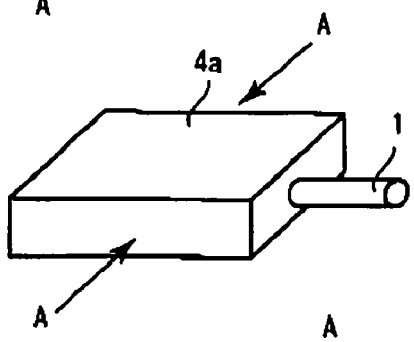

FIG. 7C shows a condition of a polyethylenedioxythiophene layer 4a formed on the surface of the dielectric layer 3.

As shown in FIG. 10, the first region 10 is provided in the inside part of the anode body (porous body) 2. The polyethylenedioxythiophene layer 4a is formed on the dielectric layer 3 formed On the surface of the particles 21 in the peripheral region of the first region 10. The region in which polyethylenedioxythiophene layer 4a is formed is the second region. The second region is formed so as to have substantially even depths from the outer peripheral part of the anode body (porous body) 2 toward inside. The second region is formed so that each depth to an interface between the first region and the second region is substantially even throughout the whole second region.

Figure 7D:
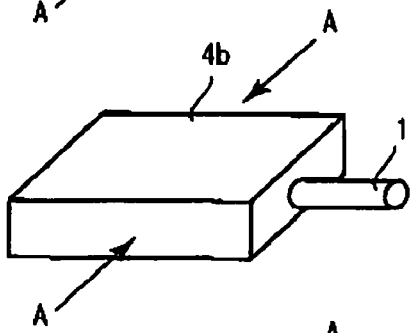

FIG. 7D shows a condition after formation of a polypyrrole layer 4b.

The polypyrrole layer 4b is formed on the dielectric layer 3 of the first region 10 and on the polyethylenedioxythiophene layer 4a of the second region.

As shown in FIG. 11, the polypyrrole layer 4b is formed in the inside part and the outer peripheral part of the anode (porous body) 2. In the first region 10 of the inside part of the anode (porous body) 2, a polyethylenedioxythiophene layer 4a is not formed on the dielectric layer 3, and therefore the polypyrrole layer 4b is formed on the dielectric layer 3.

The second region 20 is the peripheral region around the first region 10 and the region in which the polyethylenedioxythiophene layer 4a is formed on the dielectric layer 3. In the second region 20 of the outer peripheral part of the anode (porous body) 2 around the first region 10, the polyethylenedioxythiophene layer 4a is formed on the dielectric layer 3, and the polypyrrole layer 4b is formed on the polyethylenedioxythiophene layer 4a.

Figure 7E:
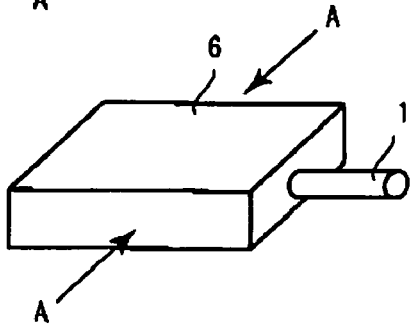

FIG. 7E shows a condition after formation of a carbon layer 5 and a silver layer 6 on the polypyrrole layer 4b in the outer peripheral part of the anode (porous body) 2.

FIG. 12 is a schematic cross-sectional view showing the condition of FIG. 7E. As shown in FIG. 12, the polypyrrole layer 4b is formed on the dielectric layer 3 formed on the surface of the particles 21 in the first region 10, while, in the second region 20, the polyethylenedioxythiophene layer 4a is formed on the dielectric layer 3 formed on the surface of the particles 21, and the polypyrrole layer 4b is formed on the polyethylenedioxythiophene layer 4a. A carbon layer 5 is formed on the polypyrrole layer 4b in the outer peripheral part of the second region 20, and a silver layer 6 is formed on the carbon layer 5.

The schematic cross-sectional view between B-B shown in FIG. 12 corresponds to FIG. 3; the schematic cross-sectional view between C-C corresponds to FIG. 4; and the schematic cross-sectional view between E-E corresponds to FIG. 5.

As shown in FIG. 7A, the anode 2 has a flat rectangular shape that is long in the X and Z directions and is short in the Y direction. Regarding the Y direction as a thickness direction, a depth d of the second region 20 from the outer peripheral surface 2a is preferably within a range of 0.67 to 33%, when a depth D from the outer peripheral surface 2a of the dielectric layer 3 in the outer peripheral part of the anode body (porous body) 2 to the center of the anode body (porous body) 2 in the thickness direction is defined as 100%.

The depth D to the center of the anode body (porous body) 2 in the thickness direction can be calculated from a whole thickness of the anode body (porous body) 2. In this embodiment, the depth of the second region, i.e., the depth d from the outer peripheral surface 2a to an interface between the first region 10 and the second region 20 is substantially even throughout the whole of the second region 20.

The thickness direction is also defined as a direction in which a distance from a first outer peripheral surface 2a to a second outer peripheral surface 2a opposed to the first outer peripheral surface 2a in a normal line F-F direction of the first outer peripheral surface 2a is the shortest among every distances defined above.

As shown in this embodiment, in case where the depth from the outer peripheral surface 2a of the dielectric layer 3 in the outer peripheral part of the anode (porous body) 2 to the center of the anode (porous body) 2 varies depending on the direction of the anode body, the preferred range of the depth of the second region may be defined based on the direction in which the depth is the shortest.

Also in the solid electrolytic capacitor of this embodiment, the polypyrrole layer 4b that is highly adhesive is provided on the dielectric layer 3 in the first region 10 inside the anode (porous body) 2, and in the second region 20, the conductive polymer layer 4 comprising the polyethylenedioxythiophene layer 4a and the polypyrrole layer 4b is provided on the dielectric layer 3. The polyethylenedioxythiophene layer 4a has good conductivity, and therefore, the conductive polymer layer 4 in the second region 20 may have good conductivity.

Accordingly, also in this embodiment, the capacitor may have a significantly reduced ESR.

EXAMPLES

The invention is described with reference to concrete Examples given hereinunder, to which, however, the invention should not be limited.

Example 1

Step 1:
First, a tantalum powder having a mean particle size of about 2 μm was sintered at about 1400° C. to form an anode of a porous sintered body with a tantalum metal lead wire embedded therein as an anode lead. The anode was processed for anodic oxidation for 10 hours at a constant voltage of 10 V in an aqueous 0.1 wt. % phosphoric acid solution kept at 40° C., thereby forming a dielectric layer of tantalum oxide on the surface in the inside part of the anode (porous body) and on the surface in the outer peripheral part thereof.

Step 2:
Next, the body formed in the step 1 was dipped in an aqueous solution of an oxidizing agent comprising 20% by weight of tertiary iron p-toluenesulfonate for 5 minutes, and then in a liquid of ethylenedioxythiophene having a purity of about 99% by weight for 10 minutes, and thereafter it was taken out, and heat-treated at 110° C. for 10 minutes to form a polyethylenedioxythiophene layer.

Next, using an ammonium persulfate solution (0.5 mol/liter) as an oxidizing agent, a polypyrrole layer was formed through chemical polymerization; and on the polypyrrole layer thus formed through chemical polymerization, formed was a polypyrrole layer through electrolytic polymerization in an acetonitrile solution of polypyrrole (2 mol/liter) and naphthalenesulfonic acid (0.1 mol/liter) with a current of 1 mA given thereto for 5 hours.

Step 3:
Next, a carbon paste and a silver paste were applied onto the conductive polymer layer in the outer peripheral part of the anode (porous body) to form a carbon layer and a silver layer thereon. Next, using a conductive adhesive, a cathode terminal was bonded to the cathode layer and an anode terminal was to the anode lead, and thereafter the structure was covered with a resin by molding to construct a solid electrolytic capacitor A.

Comparative Example 1

A solid electrolytic capacitor X was constructed in the same manner as in the above Example 1, for which, however, the polyethylenedioxythiophene layer was not formed and the polypyrrole layer was formed through chemical polymerization and electrolytic polymerization in the step 2.

Comparative Example 2

A solid electrolytic capacitor Y was constructed in the same manner as in the above Example 1 except for the following: In the step 2, the polyethylenedioxythiophene layer was not formed, and on the dielectric layer, a polypyrrole layer was formed through chemical polymerization, using ammonium persulfate (0.5 mol/liter) and tetraethylammonium paratoluenesulfonate (0.2 mol/liter) as an oxidizing agent, and then an additional polypyrrole layer was further formed on the polypyrrole layer through electrolytic polymerization.

Comparative Example 3

An anode on which a dielectric layer was formed in the step 1 in Example 1 was dipped in a solution comprising the following:
ethylenedioxythiophene, 5% by weight,
p-toluenesulfonic acid, 25% by weight,
n-butanol, 30% by weight,
i-propanol, 37% by weight,
pure water, 3% by weight,
and then this was polymerized at 50° C. for 10 minutes. The unreacted monomer and the excess acid were washed away, and then this was dried at 100° C. for 5 minutes. The process of dipping, washing with water and drying was repeated 5 times, thereby forming a polyethylenedioxythiophene layer on the dielectric layer.

Next, on the thus-formed polyethylenedioxythiophene layer, further formed was a polypyrrole layer through electrolytic polymerization. Thereafter this was processed in the same manner as in Example 1 to construct a solid electrolytic capacitor Z.

<Evaluation of Solid Electrolytic Capacitor>

The solid electrolytic capacitor A in Example 1, and the solid electrolytic capacitors X, Y and Z in Comparative Examples 1 to 3 were tested for ESR at a frequency of 100 kHz, using an LCR meter. The data are shown in Table 1.

The cross section of the capacitor element produced in the step 2 in Example 1 was analyzed for the sulfur distribution therein through EPMA, and the depth d of the second region 20 shown in FIG. 1, in which the polyethylenedioxythiophene layer was formed, was determined. As a result, the depth d of the second region 20 was 20% of the depth D.

The capacitor elements produced in Comparative Examples 1 and 2 were also analyzed in the same manner as above, but a polyethylenedioxythiophene layer was not formed in both the outer peripheral part and the inside part of the porous body.

The capacitor element produced in Comparative Example 3 was also analyzed in the same manner as above. As a result, it was confirmed that the polyethylenedioxythiophene layer was formed almost uniformly in the outer peripheral part and the inside part of the porous body, and the depth d was nearly 100%.

TABLE 1

|  | ESR (mΩ) |
| --- | --- |
| Solid Electrolytic Capacitor A | 7 |
| Solid Electrolytic Capacitor X | 12 |
| Solid Electrolytic Capacitor Y | 12 |
| Solid Electrolytic Capacitor Z | 15 |

As is obvious from the results in Table 1, it is confirmed that the solid electrolytic capacitor A of Example 1 of the invention has a significantly reduced ESR as compared with the solid electrolytic capacitors X, Y and Z of Comparative Examples.

Example 2

This Example is to investigate the relationship between the depth d of the second region and ESR.

In the step 2 in Example 1, the heat treatment temperature was changed from 110° C. to 85° C., 90° C., 95° C., 130° C., 150° C., 160° C. or 170° C. to form the polyethylenedioxythiophene layer. The others than this were the same as in Example 1, and solid electrolytic capacitors B1 to B7 were constructed. These were analyzed for the sulfur distribution through EPMA in the same manner as above, and the depth d of the second region was determined, and the ratio of the depth d to the depth D was computed. As a result, the ratio of the depth d to the depth D in the solid electrolytic capacitors B1, B2, B3, B4, B5, B6 and B7 was 0%, 1%, 5%, 25%, 30%, 50% and 60%, respectively.

In the same manner as above, ESR of the solid electrolytic capacitors B1 to B7 was measured, and the data are shown in Table 2. In Table 2, also shown are the data of the solid electrolytic capacitor A of Example 1.

TABLE 2

| | Heat Treatment Temperature (° C.) | Ratio of depth of second region to depth D (%) | ESR (mΩ) |
|---|---|---|---|
| Solid Electrolytic Capacitor B1 | 85 | 0 | 9 |
| Solid Electrolytic Capacitor B2 | 90 | 1 | 8 |
| Solid Electrolytic Capacitor B3 | 95 | 5 | 7 |
| Solid Electrolytic Capacitor A | 110 | 20 | 7 |
| Solid Electrolytic Capacitor B4 | 130 | 25 | 7 |
| Solid Electrolytic Capacitor B5 | 150 | 30 | 7 |
| Solid Electrolytic Capacitor B6 | 160 | 50 | 8 |
| Solid Electrolytic Capacitor B7 | 170 | 60 | 10 |

As is obvious from the results in Table 2, it is known that the depth d of the second region can be controlled by controlling the heat treatment temperature in forming the polyethylenedioxythiophene layer. When the heat treatment temperature was higher, then the polyethylenedioxythiophene layer grew in a deeper site inside the porous body.

As is obvious from the results in Table 2, the depth d of the second region is preferably within a range of from 0% to 50% relative to the depth D, more preferably within a range of from 5% to 30%.

In Table 2, the ratio of the depth d of the second region of the solid electrolytic capacitor B1 is 0%, and this means that the second region was not formed in the inside of the outer peripheral surface 2a of the dielectric layer in the outer peripheral part of the porous body, but was formed only in the outside of the outer peripheral surface 2a.

Example 3

Step 1:

A tantalum powder having a mean particle size of about 2 μm was sintered at about 1400° C. to form an anode of a porous sintered body (size: 4.3 mm×3.3 mm×0.9 mm) with a tantalum metal lead wire (lead diameter: 300 μm) embedded therein as an anode lead. The anode was processed for anodic oxidation for 10 hours at a constant voltage of 10 V in an aqueous 0.1 wt. % phosphoric acid solution kept at 40° C., thereby forming a dielectric layer of tantalum oxide on the surface in the inside part of the anode (porous body) and on the surface in the outer peripheral part thereof.

Step 2:

Next, the body formed in the step 1. was dipped in an aqueous solution of an oxidizing agent comprising 20% by weight of tertiary iron p-toluenesulfonate for 5 minutes, and then in a liquid of ethylenedioxythiophene having a purity of about 99% by weight for 10 minutes, and thereafter it was taken out, and heat-treated at 110° C. for 10 minutes to form a polyethylenedioxythiophene layer. Thereafter this was processed in the same manner as in Example 1 to construct a solid electrolytic capacitor C1.

The cross section of the structure cut in the direction vertical to the anode lead was analyzed for sulfur distribution through EPMA. As a result, the depth of the second region in which the polyethylenedioxythiophene layer was formed, or that is, the depth d of the second region 20 shown in FIG. 12 was 60 μm. During the heat treatment, which provides the formation of the polyethylenedioxythiophene layer, after dipping in the liquid of ethylenedioxythiophene, the anode body is uniformly heated from the device surface thereof, so that the depth of the second region is even throughout the whole.

Example 4

In the step 2 in Example 3, the concentration of the aqueous solution of an oxidizing agent comprising tertiary iron p-toluenesulfonate was changed from 20% by weight to 2% by weight, 5% by weight, 10% by weight, 25% by weight, 30% by weight or 35% by weight. The others than this were the same as in Example 3, and solid electrolytic capacitors C2 to C7 were constructed.

Like in Example 3, these were analyzed for sulfur distribution through EPMA, and the depth d of the second region 20 was determined. The results are shown in Table 3. Further, the ratio of (depth d/depth D)×100 was determined and the results are shown in Table 3. The size of the porous body in the thickness direction (the Y direction) is 0.9 mm and therefore the depth D is about 0.45 mm (450 μm). Accordingly, the ratio of (depth d/depth D)×100 was calculated from the depth D of 450 μm and shown in Table 3.

Like in Example 1, the solid electrolytic capacitors C2 to C7 were tested to determine ESR, and the results are shown in Table 3.

TABLE 3

| | Tertiary Iron P-toluenesulfonate (wt. %) | depth d of second region 20 (μm) | (depth d/depth D) × 100 (%) | ESR (mΩ) |
|---|---|---|---|---|
| Solid Electrolytic Capacitor C2 | 2 | 3 | 0.67 | 8 |
| Solid Electrolytic Capacitor C3 | 5 | 15 | 3.3 | 7 |
| Solid Electrolytic Capacitor C4 | 10 | 30 | 6.7 | 7 |
| Solid Electrolytic Capacitor C1 | 20 | 60 | 13 | 7 |
| Solid Electrolytic Capacitor C5 | 25 | 90 | 20 | 7 |
| Solid Electrolytic Capacitor C6 | 30 | 150 | 33 | 8 |
| Solid Electrolytic Capacitor C7 | 35 | 180 | 40 | 10 |

As understood from the results in Table 3, it is known that the depth d of the second region can be controlled by controlling the concentration of the aqueous solution of the oxidizing agent (tertiary iron p-toluenesulfonate solution) to be used in forming the polyethylenedioxythiophene layer. Specifically, when the concentration of the aqueous oxidizing agent solution was higher, then the polyethylenedioxythiophene layer grew in a deeper site inside the porous body.

As understood from the found data of ESR in Table 3, the solid electrolytic capacitors C2 to C7 exhibit lower ESR values compared with those of the solid electrolytic capacitors X to Z in Comparative Examples 1 to 3. As shown in Table 3, it is also known that the depth d of the second region is further preferably within a range of at most 150 μm. As understood from the ratios of (depth d/depth D)×100 shown in Table 3, it is known that the depth d of the second region relative to the depth D is further preferably within a range of from 0.67 to 33%.

What is claimed is:

1. A solid electrolytic capacitor comprising:
    an anode of a porous body formed of a valve metal or its alloy,
    an anode lead of which one end is embedded inside said anode;
    a dielectric layer formed on a surface of said porous body and in an inside part of the anode;
    a conductive polymer layer formed on said dielectric layer formed on the surface of said porous body,
    said anode having a first region and a second region sharing a common periphery in the inside part of the anode,
    said first region being located from a surface of the anode lead to the common periphery in the inside part of said porous body,
    said second region being located from the common periphery to a surface of the conductive polymer layer,
    a cathode layer formed on said conductive polymer layer in the second region of said anode;
    said conductive polymer layer in said first region being formed of a polypyrrole layer alone around the anode lead,
    said conductive polymer layer in said second region being composed of a polyethylenedioxythiophene layer provided on the dielectric layer and the polypyrrole layer provided on the polyethylenedioxythiophene layer, and
    said cathode layer being formed on the polypyrrole layer in said second region.

2. The solid electrolytic capacitor as claimed in claim 1, wherein each depth from the outer peripheral surface of said dielectric layer in the outer peripheral part of said porous body to an interface between said first region and said second region is substantially even throughout the whole second region.

3. The solid electrolytic capacitor as claimed in claim 1, wherein a depth of the second region from the outer peripheral surface of said dielectric layer in the outer peripheral part of said porous body is within a range of 0.67 to 33%, when a depth from the outer peripheral surface of said dielectric layer in the outer peripheral part of said porous body to the center of said porous body in a thickness direction is defined as 100%, the thickness direction being defined as a direction in which a distance from a first outer peripheral surface of said dielectric layer in the outer peripheral part of said porous body to a second outer peripheral surface opposed to the first outer peripheral surface in a normal line direction of the first outer peripheral surface is the shortest among every distances defined above.

4. The solid electrolytic capacitor as claimed in claim 1, wherein said porous body has a substantially rectangular shape, and wherein a depth of the second region from the outer peripheral surface of said dielectric layer in the outer peripheral part of said porous body is within a range of 0.67 to 33%, when a depth from the outer peripheral surface of said dielectric layer in the outer peripheral part of said porous body to the center of said porous body in a thickness direction is defined as 100%, the thickness direction being defined as a direction which provides with the shortest dimension among the dimension directions perpendicular to one another in the substantially rectangular shape.

5. A method for producing a solid electrolytic capacitor of claim 1, comprising the steps:
    forming said anode of said porous body with one end of said anode lead embedded therein,
    forming said dielectric layer on the surface in the inside part of said porous body and on the surface in the outer peripheral part thereof,
    dipping said porous body having said dielectric layer in a solution of ethylenedioxythiophene and then heat-treating it at a predetermined temperature to thereby form the polyethylenedioxythiophene layer on said dielectric layer in the second region,
    forming said conductive polymer layer formed of the polypyrrole layer alone on said dielectric layer in the first region, and
    forming the polypyrrole layer on the polyethylenedioxythiophene layer in the second region.

6. The method for producing a solid electrolytic capacitor as claimed in claim 5, wherein the heat-treatment temperature falls within a range of from 90 to 150° C.

7. A solid electrolytic capacitor comprising:
    an anode of a porous body formed of a valve metal or its alloy,
    a dielectric layer formed on a surface of said porous body and in an inside part of the anode;
    a conductive polymer layer formed on said dielectric layer formed on the surface of said porous body; and
    an anode lead of which one end is embedded inside said anode;
    said anode having a first region and a second region sharing a common periphery in the inside part of the anode,
    said first region being provided in the inside part of said porous body and located from a surface of the anode lead to the common periphery,
    said second region being located from the common periphery to a surface of the conductive polymer layer,
    said conductive polymer layer in said first region being formed of a polypyrrole layer alone around the anode lead,
    said conductive polymer layer in said second region being composed of a polyethylenedioxythiophene layer provided on the dielectric layer and the polypyrrole layer provided on the polyethylenedioxythiophene layer, and
    a cathode layer formed on said conductive polymer in the second region of said anode, wherein said cathode layer is formed on the polypyrrole layer in said second region.

8. The solid electrolytic capacitor as claimed in claim 2, wherein each depth from the outer peripheral surface of said dielectric layer in the outer peripheral part of said porous body to an interface between said first region and said second region is substantially even throughout the whole second region.

9. The solid electrolytic capacitor as claimed in claim 2, wherein a depth of the second region from the outer peripheral surface of said dielectric layer in the outer peripheral part of said porous body is within a range of 0.67 to 33%, when a depth from the outer peripheral surface of said dielectric layer in the outer peripheral part of said porous body to the center of said porous body in a thickness direction is defined as 100%, the thickness direction being defined as a direction in which a distance from a first outer peripheral surface of said dielectric layer in the outer peripheral part of said porous body to a second outer peripheral surface opposed to the first outer peripheral surface in a normal line direction of the first outer peripheral surface is the shortest among every distances defined above.

10. The solid electrolytic capacitor as claimed in claim 2, wherein said porous body has a substantially rectangular shape, and wherein a depth of the second region from the outer peripheral surface of said dielectric layer in the outer peripheral part of said porous body is within a range of 0.67 to 33%, when a depth from the outer peripheral surface of said dielectric layer in the outer peripheral part of said porous body to the center of said porous body in a thickness direction is defined as 100%, the thickness direction being defined as a direction which provides with the shortest dimension among the dimension directions perpendicular to one another in the substantially rectangular shape.

11. A method for producing a solid electrolytic capacitor of claim 7, comprising the steps:
   forming said anode of said porous body with one end of said anode lead embedded therein,
   forming said dielectric layer on the surface in the inside part of said porous body and on the surface in the outer peripheral part thereof,
   dipping said porous body having said dielectric layer in a solution of ethylenedioxythiophene and then heat-treating it at a predetermined temperature to thereby form the polyethylenedioxythiophene layer on said dielectric layer in the second region,
   forming said conductive polymer layer formed of the polypyrrole layer alone on said dielectric layer in the first region, and
   forming the polypyrrole layer on the polyethylenedioxythiophene layer in the second region.

12. The method for producing a solid electrolytic capacitor as claimed in claim 11, wherein the heat-treatment temperature falls within a range of from 90 to 150° C.

* * * * *